United States Patent
Bandy, Jr.

(10) Patent No.: US 6,401,912 B1
(45) Date of Patent: Jun. 11, 2002

(54) CONVEYOR PAN ASSEMBLY WITH REPLACEABLE DECK

(76) Inventor: Clarence L. Bandy, Jr., P.O. Box 100, 33352 Hillman Hwy., Glade Spring, VA (US) 24340-0100

(*) Notice: Subject to any disclaimer, the term of this patent is extended or adjusted under 35 U.S.C. 154(b) by 0 days.

(21) Appl. No.: 09/426,869

(22) Filed: Oct. 26, 1999

(51) Int. Cl.[7] .............................................. B65G 19/28
(52) U.S. Cl. ............................... 198/735.4; 198/860.3; 299/43; 299/64
(58) Field of Search ......................... 198/735.4, 860.3; 299/43, 64

(56) References Cited

U.S. PATENT DOCUMENTS

| | | | |
|---|---|---|---|
| 3,617,092 A | * 11/1971 | Kohler et al. | 299/43 |
| 3,842,966 A | * 10/1974 | Blumenthal et al. | 198/806.3 |
| 4,013,167 A | 3/1977 | Bourgeois | |
| 4,027,770 A | * 6/1977 | Collier | 198/735.4 |
| 4,282,968 A | 8/1981 | Temme | |
| 4,359,154 A | 11/1982 | Temme | |
| 4,373,757 A | 2/1983 | Gehle et al. | |
| 4,420,075 A | 12/1983 | Skolik et al. | |
| 4,484,677 A | 11/1984 | Berwald | |
| 4,632,239 A | 12/1986 | Schoop et al. | |
| 4,637,510 A | 1/1987 | Tomlinson | |
| 4,643,296 A | * 2/1987 | Braun et al. | 198/735.4 |
| 4,658,952 A | * 4/1987 | Grundken et al. | 198/735.4 |
| 4,667,811 A | 5/1987 | Schoop et al. | |
| 4,705,160 A | * 11/1987 | Grundken et al. | 198/735.4 |
| 4,735,304 A | 4/1988 | Schoop et al. | |
| 4,787,501 A | 11/1988 | Rassmann et al. | |
| 4,842,128 A | 6/1989 | Tomlinson | |
| 5,131,724 A | 7/1992 | Bandy, Jr. et al. | |
| 5,156,258 A | * 10/1992 | Steinkuhl et al. | 198/735.6 |
| 5,184,873 A | 2/1993 | Fiesel | |
| 5,224,582 A | 7/1993 | Hahn et al. | |
| 5,605,220 A | 2/1997 | Krohm | |
| 5,700,061 A | 12/1997 | Merten et al. | |
| 5,871,261 A | 2/1999 | Bandy, Jr. et al. | |

* cited by examiner

Primary Examiner—Christopher P. Ellis
Assistant Examiner—Kohi H. Tran
(74) Attorney, Agent, or Firm—King and Schickli PLLC

(57) ABSTRACT

A conveyor pan assembly, and a corresponding conveyor line, for an armored face conveyor is provided wherein each pan assembly has a replaceable upper deck plate fabricated of wear-resistant steel. A lower support plate of mild steel is mechanically attached, such as by structural welds, to spaced tabs projecting inwardly from opposed parallel sidewalls. The lateral edges of the deck plate mate with grooves formed in the adjacent sidewalls above the projecting tabs. One or more slots formed in the underside of the support plate receive structural welds that assist in holding the deck plate in place. No structural welds holding the upper deck plate in place are exposed to wear created by the flights, coal or other aggregate material moving along the conveyor feed path. The sidewalls remain separated by the lower support plate when the deck plate is removed during replacement. Along the length of the pan assembly, the upper deck plate is positioned in a longitudinal, offset position such that a projecting lip at one end thereof overlaps with a mating narrow strip of the lower support plate at the other end of the next-in-line pan assembly. A corresponding method of fabricating the conveyor pan assembly and conveyor line is also provided.

20 Claims, 4 Drawing Sheets

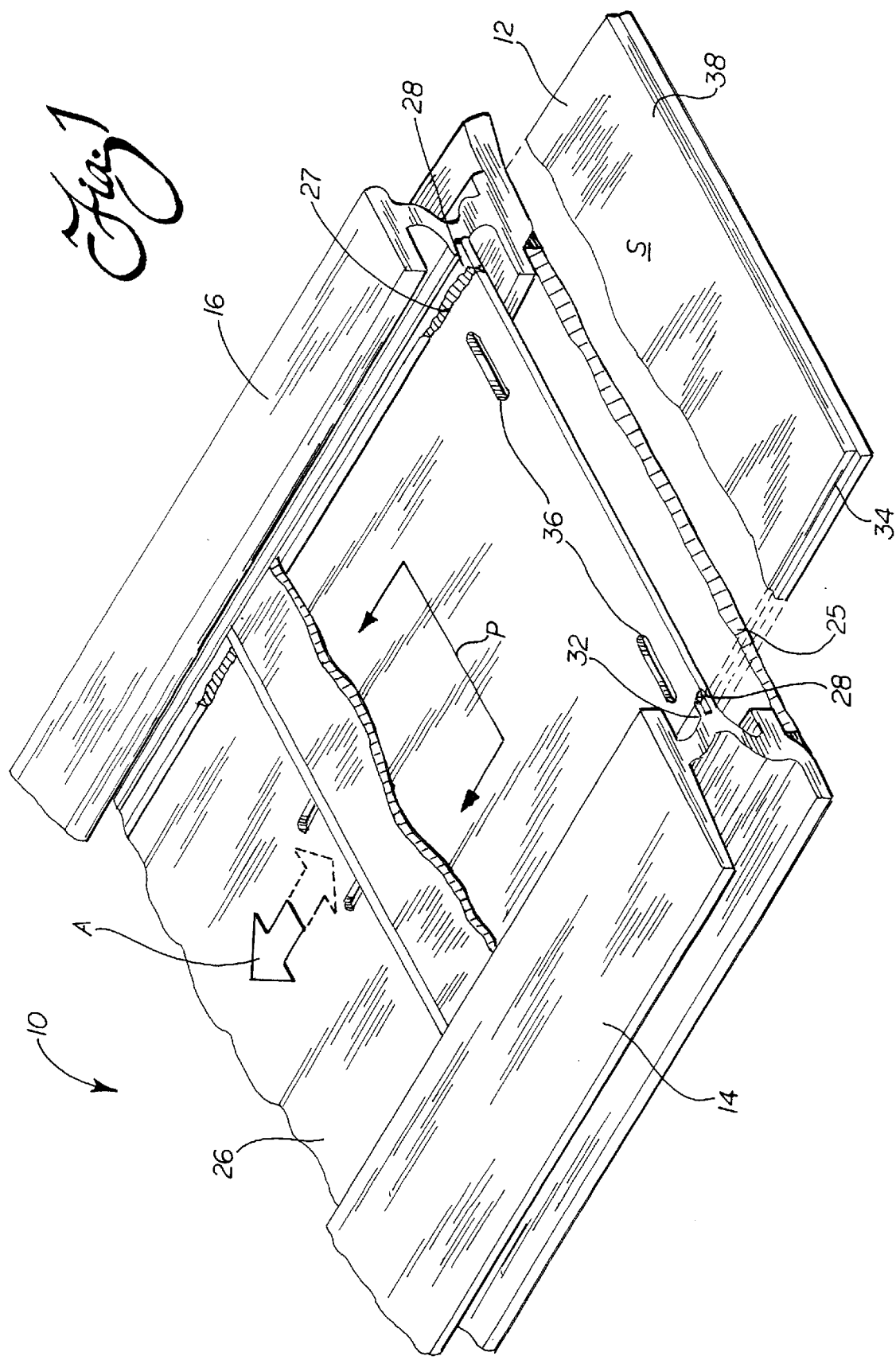

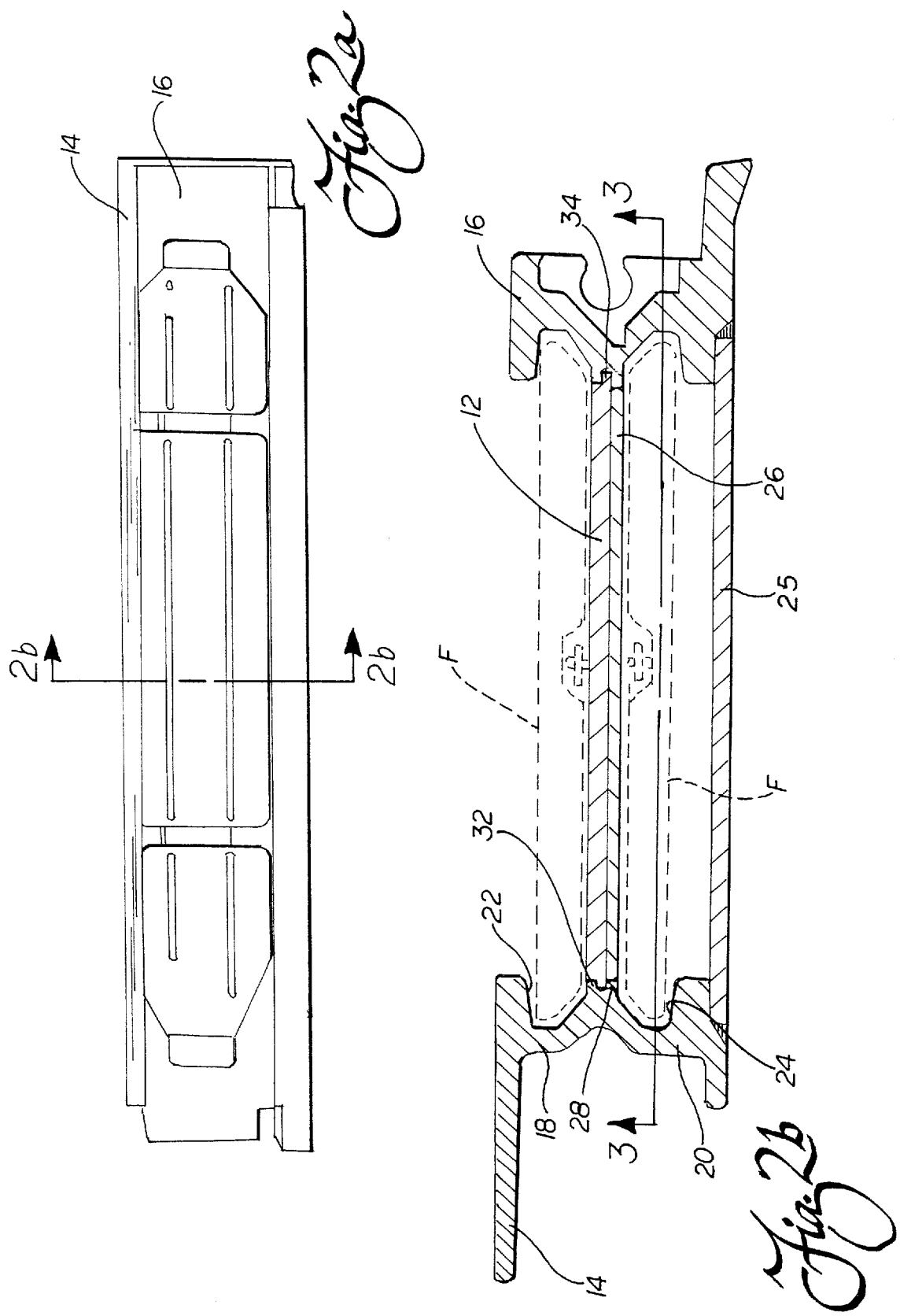

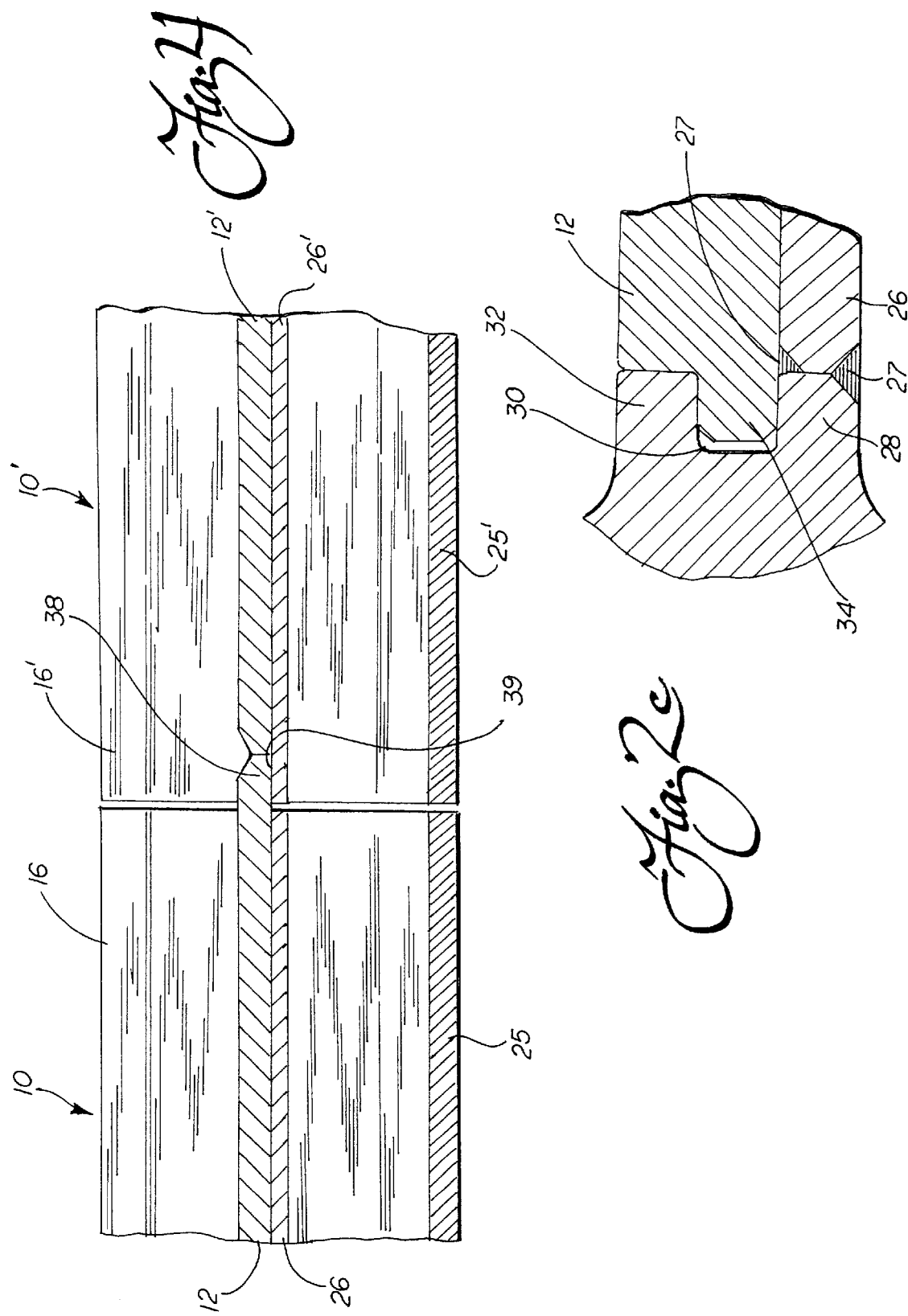

CONVEYOR PAN ASSEMBLY WITH REPLACEABLE DECK

TECHNICAL FIELD

The present invention relates generally to endless conveyors for aggregate materials and, more particularly, to a conveyor pan assembly for an armored face conveyor for handling coal in a longwall mining system.

BACKGROUND OF THE INVENTION

Various types of conveyor pan assemblies for armored face conveyors are well known in the art. Typically, each pan assembly includes a deck plate positioned between and providing support for a pair of parallel sidewalls. The deck plate provides a conveying surface for the coal or other aggregate material being conveyed. The sidewalls form tracks for the longwall mining machine as it moves back and forth along the mine face.

Attachment of the sidewalls to the deck plate is attained by placing elongated structural welds along the upper and lower chamfered lateral edges of the deck plate. Usually, the sidewalls are cast in a sigma shape such that when the deck plate is placed between them, upper and lower troughs or runs are defined. Of course, the upper trough of each pan assembly serves to guide the flight bars pulled along by a drive chain for moving the aggregate material along the conveyor line to a takeaway conveyor; the inverted lower trough guiding the flights during the return. To form the conveyor line, a plurality of the pan assemblies are placed in an end to end relationship, usually by forming a welded joint between specially shaped mating faces on the ends.

One prevalent problem with known types of conveyor pan assemblies is that the structural welds between the deck plate and the sigma sidewalls are positioned both above and below the conveying surface, as shown in Westfalia's U.S. Pat. No. 4,484,677 to Berwald. There are several shortcomings in this design. The first is that placing two full length structural welds along the entire length of both lateral edges above and below the deck plate greatly increases the manufacturing time and expense. The second is that these above (or top) structural welds along the sidewalls are thus exposed to significant wear created by the flights and aggregate material moving over them along the upper run of the conveyor line. This deleterious wear on these critical structural welds is the single most important factor limiting the service life of the conveyor pan assembly. Forming the deck plate of hardened steel or other abrasion-resistant materials reduces wear on the conveying surface, but the structural welds holding the deck plate in place are softer and wear more quickly. If the structural welds on the deck plate holding the sidewalls in place are significantly weakened, the support of the mining machine is threatened. Deleterious production downtime is required while the mining operation is temporarily shut down to remove and repair the pan assembly, including replacing the deck plate. The complete failure of one of these structural welds can even lead to a total failure of the longwall mining and armored face conveyor system if the developing weakness is not detected in time.

A number of solutions have been proposed to eliminate the deleterious effects of wear on the structural welds created by the flights and aggregate material, as well as to reduce the amount of structural welding required to provide a strong, long-lasting conveyor pan assembly. One recent proposal is found in U.S. Pat. No. 5,131,724 to Bandy, Jr. et al., of which I am a co-inventor. A deck plate with outwardly projecting keys fit into mating slots formed in the sigma sidewalls. By placing the structural welds exteriorly of the sidewalls where the keys project through the slots (see FIG. 2 of the '724 patent), the deleterious effects of wear created by the flights/aggregate material are eliminated.

While this pan assembly overcomes the wear problem and is a significant improvement over prior art proposals, one remaining limitation is that the upper deck plate is still attached directly to and provides the sole support for the sigma sidewalls. Thus, when the deck plate eventually wears out and is in need of replacement, the entire pan assembly must disassembled. This includes: (1) cutting the structural welds formed around the keys on the lateral edges of the deck plate where they project through the slots in the sigma sidewalls; (2) removing the worn deck plate; (3) making the necessary repairs; and (4) reinstalling a replacement deck plate. To do this, the sidewalls must be physically removed and separated apart from the deck plate. The spacing between the sidewalls is no longer set. The next step (5) thus involves the difficult and tedious step of realigning the sidewalls and resetting the spacing to receive the deck plate. Finally, step (6) involves proceeding to weld the deck plate back in place between the opposed sidewalls. This has thus proven to be a very time consuming and labor intensive operation.

While there have been improvements in this basic technology such as is found in the conveyor pan assembly shown and described in U.S. Pat. No. 5,871,261, of which I am also a co-inventor, these changes are directed to other features. For example, in this '261 patent, elongated bevels are added along the entire lower longitudinal edges of the deck plate to mate with similar bevels on the sidewalls. But, with this change in the structure, the same basic repair/replacement procedure as in the '724 patent is required.

To try to facilitate this repair of the pan assembly, including replacement of the deck plate, without disconnecting the sidewalls, others have proposed splitting the conveyor pan assemblies, including the sigma sidewalls, into separate upper and lower sub-assemblies that are mechanically fastened together by a connector bar. An example is found in Westfalia's U.S. Pat. No. 4,632,239 to Schoop et al., wherein external connector bars and fastener assemblies are used to secure the two sub assemblies together. While this arrangement permits removal of the upper sub-assembly with the deck plate for replacement, without the need for cutting structural welds, a different problem appears. These extra components are expensive and the fasteners are sometimes difficult to loosen for replacement due to the build-up of rust, corrosion and other debris. Furthermore, any kind of mechanical connection such as this, can over time loosen on its own due to the vibration of the mining machinery. Specifically, the connector bars/fasteners may loosen due to the significant jarring caused by the traversing mining machine supported on the sidewalls. Furthermore, loosening action can be aggravated by the vibrations created as the flights and aggregate materials move along the conveyor. Of course, even a slight misalignment of the upper sidewall section and the deck plate during the replacement effort, can make it difficult to reapply and tighten the connector bars/fasteners. Even when the sigma sidewalls are made integral, the connector bars/fasteners are required, and the full length side welds must be cut in order to replace the deck plate.

Thus, a need is identified for an improved conveyor pan assembly having a deck plate that is easier to install and remove, and is more economical in both initial cost and maintenance. The sigma sidewalls would remain assembled with a support plate so that the spacing is always maintained.

All structural welds for holding the deck plate in place would be positioned away from the conveying surface. As an added advantage, the amount of structural welding required during fabrication of the conveyor pan assembly would be reduced without compromising its structural strength. Mounting the deck plate, but not the support plate, in an offset position in a longitudinal direction would also facilitate forming a secure overlapping joint with the next-in-line conveyor pan assembly. There would be no need for specially forming the ends of adjacent conveyor pans to fit together. Overall, the conveyor pan assembly would result in a significant improvement over prior art proposals, particularly in terms of ease and cost of manufacturing, service life, reliability, and structural integrity.

SUMMARY OF THE INVENTION

Keeping the foregoing needs in specific focus, it is a primary object of the present invention to provide a conveyor pan assembly that overcomes the limitations and shortcomings of the above-referenced prior art conveyor pan assemblies.

Another object of the present invention is to provide a conveyor pan assembly including an easily replaceable deck plate that forms a conveying surface and a lower support plate extending between and spacing the opposed sidewalls, whereby during installation or removal of the upper deck plate for replacement, the sidewalls remain attached to and fully supported by the lower support plate.

Still another object of the present invention is to provide a conveyor pan assembly in which each lateral edge of a deck plate can slide along corresponding grooves formed in a pair of opposed sidewalls to facilitate installation or removal of the deck plate, while the lower support plate remains in position between and fully maintains the spacing of the sidewalls.

A related object is to provide a conveyor pan assembly in which lateral edges are captured and held by a tongue and groove joint that allows the deck plate to be easily slid into and out of position to form the pan assembly.

Another object is to provide such a pan assembly wherein one end of the deck plate is offset relative to the sidewalls and the support plate to form an overlapping joint with the next-in-line pan assembly, thereby avoiding the need for specially forming the ends of the support plate.

A further object of the present invention is to provide the lower support plate in a conveyor pan assembly with at least one slot for receiving a structural weld that assists in holding the upper deck plate in position relative to the sidewalls of the pan assembly, whereby placing the weld in the slot and away from the conveying surface, where it would otherwise be subject to the deleterious effects of wear created by the flights moving the coal or other aggregate material along the feed path.

Yet another object of the present invention is to provide a conveyor pan assembly wherein the support plate is further welded along only its lateral edges to a plurality of spaced tabs projecting inwardly from each sidewall, whereby the overall amount of structural welding required during fabrication of the conveyor pan assembly is further significantly reduced.

Still a further object of the present invention is to provide a method of fabricating a conveyor pan assembly wherein the deck plate is easily installed or removed for replacement; and also a method is provided for more efficiently forming a conveyor line from a plurality of such pan assemblies.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, an improved conveyor pan assembly is disclosed for an armored face conveyor system, such as for handling coal or other aggregate material. Each conveyor pan assembly includes: (1) a lower support plate attached to and extending between a pair of opposed sidewalls; and (2) an upper deck plate placed over the lower support plate to provide the conveying surface. As outlined above, and as will be seen in further detail from the discussion which follows, providing separate deck and support plates in accordance with the present invention provides several significant advantages in forming the conveyor pan assembly of the present invention.

In accordance with the first of several important aspects of the invention, each lateral edge of the upper deck plate forms a full length tongue that is received in a corresponding elongated groove formed in the adjacent sidewall. Advantageously, the lateral side edges can slide along the grooves to simplify installation or removal of the deck plate, while the sidewalls remain attached to and supported upright and properly spaced by the lower support plate. There is no need for disconnecting the sidewalls from the lower support plate. As should be appreciated, this sliding tongue and groove joint significantly eases the process of installation of the upper deck plate during manufacturing. Also, when the upper deck plate becomes worn and is in need of replacement, the tongue and groove joint also facilitates removal of the deck plate.

In the preferred embodiment, the sidewalls are sigma-shaped in cross section and formed of cast steel to provide superior strength to the pan assembly. The support plate is mild rolled steel, while the deck plate is hardened, abrasion resistive steel.

The deck plate in combination with the adjacent upper recesses or indentations in the sigma sidewalls define an upper run portion for guiding the flights and confining the coal as the flights are being driven by a drive chain along the feed path. Below the support plate, a similarly configured, but inverted lower run portion is provided for guiding the flights during the return trip to form the endless conveyor.

Each sigma sidewall preferably includes a plurality of spaced, inwardly projecting tabs that serve as attachment points for the lateral edges of the support plate. In addition to providing an attachment point, each tab also serves to define inwardly projecting extensions of the lower edge of the groove formed in each sigma sidewall. In forming the preferred pan assembly of the present invention, the lateral edges of the support plate are structurally butt welded to each tab. The tabs, as well as the structural welds holding the support plate in place to the sidewalls, are advantageously protected from wear.

As should be appreciated, the use of spaced tabs for receiving the structural welds to hold the lower support plate in place avoids the need for welding along the entire length of the pan assembly. This advantageously reduces the manufacturing effort and expense. Although fewer structural welds are required, the strength of the fully assembled pan assembly is not compromised. This is because additional structural support is provided by the tongue and groove captivation joint formed between the deck plate and the sidewalls. In other words, this overlapping support serves to transfer the weight of the coal or other aggregate material being conveyed over the entire length of the lateral tongue and groove joints defined by the tabs and over the support deck welded thereto.

In accordance with another important aspect of the invention, the support plate includes at least one slot extending therethrough for receiving at least one structural weld. This structural weld further assists in holding the upper deck plate in place between the sigma sidewalls. By placing this structural weld in a slot totally away from the conveying surface, the potential for wear to the weld, as created by the flights moving along the feed path of the armored face conveyor, is also eliminated. The weld is preferably focused at the interface between the upper edge of the slot and the exposed underside surface of the upper deck plate. Preferably, several slots and welds are used. Depending on the number of these welds used, each need extend over only a relatively small surface area, and to a minimum depth. For example, in some relatively light duty pan assemblies, tack welds can be used. In other situations, a bead weld can fully fill the slot for maximum strength.

Thus, as should now be appreciated, all of the structural welds holding the upper deck plate in place, as well as the welds attaching the lower support plate to the sidewalls, do not form any part of the conveying surface and thus are not exposed to wear. This advantageously extends the service life of the conveyor pan assembly considerably, which in turn reduces the maintenance and repair expense. Additionally, significant periods of costly production downtime due to potential mining machine and conveyor shutdowns are eliminated. Also, the replaceable upper deck concept of this invention allows each pan assembly to be repaired and placed back into production in the shortest possible time.

The upper deck plate in the conveyor pan assembly of the preferred embodiment is mounted in an offset position in a longitudinal direction relative to the lower support plate. In this offset position, one end of the upper deck plate can form an overlapping joint with the next-in-line conveyor pan assembly. The extended lip of the deck plate mates with an exposed narrow strip of the support plate on an adjacent pan assembly to form the joint. This feature avoids the need for specially machining or otherwise forming the ends of the conveyor pan assemblies to mate together to form a conveyor line, as is typical of many known types of pan assemblies. This reduces manufacturing expense and also provides flexibility in swapping conveyor pan assemblies between different conveyor lines formed of similar types of pan assemblies. The overlapping joint eliminates interference with the flight bars as they are pulled along the feed path defined by the deck plate.

In accordance with another important aspect of the present invention, a method of fabricating a conveyor pan assembly, as well as a conveyor line made up of the pan assemblies, is disclosed. The method includes the step of attaching a lower support plate to a pair of opposed sidewalls, such as by welding it in place to inwardly projecting edges on the sidewalls. Preferably, these sidewall edges are formed as spaced tabs. Each of the sidewalls is thus provided with a lateral groove for receiving the lateral edges of an upper deck plate to form tongue and groove joints along the sides. Advantageously, to form these joints, the upper deck plate is simply slid into position as it is held in the grooves. The upper deck plate is then simply attached to the lower support plate to assist in holding it in place, such as by placing welds in slots formed in the lower support plate, or other equivalent attachment means.

The method may also include the step of mounting the upper deck plate in an offset position in a longitudinal direction relative to the lower support plate and the sidewalls, such that an overlapping joint may be formed with a next-in-line conveyor pan. It should also be recognized that during manufacturing, the ability of the upper deck plate to slide along the tongue and groove joint formed between the sidewalls greatly facilitates mounting it in this offset position. By interfitting a plurality of pan assemblies manufactured in accordance with the foregoing description, the continuous conveyor line for the armored face conveyor is provided.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming apart of the specification, illustrate several aspects of the present invention and, together with the description, serve to explain the principles of the invention. In the drawings:

FIG. 1 is perspective, partially exploded and cut-away view of the conveyor pan assembly of the present invention showing the manner in which the lateral edges of the upper deck plate can slide into the corresponding grooves formed in the side walls;

FIG. 2a is a side view of a single conveyor pan assembly looking from the near side of FIG. 1;

FIG. 2b is a cross-sectional view taken along line 2b—2b in FIG. 2a showing the manner in which the lower support plate attaches to the edges of tabs projecting from the sigma sidewalls; each of these tabs defining an extension of the lower boundary of the elongated grooves in the sidewalls that receive the lateral edges of the deck plate;

FIG. 2c is an enlarged cross-sectional view showing the detail of the tongue and groove joint formed between the lateral edges of the upper deck plate and the sidewalls, as well as the structural attachment between the lower support plate and one of the projecting tabs;

FIG. 4 is a cross-sectional view of the overlapping joint formed by the projecting lip of the upper deck plate of a first conveyor pan assembly with the exposed narrow strip of the lower support plate of a next-in-line conveyor pan assembly.

Figure 3:
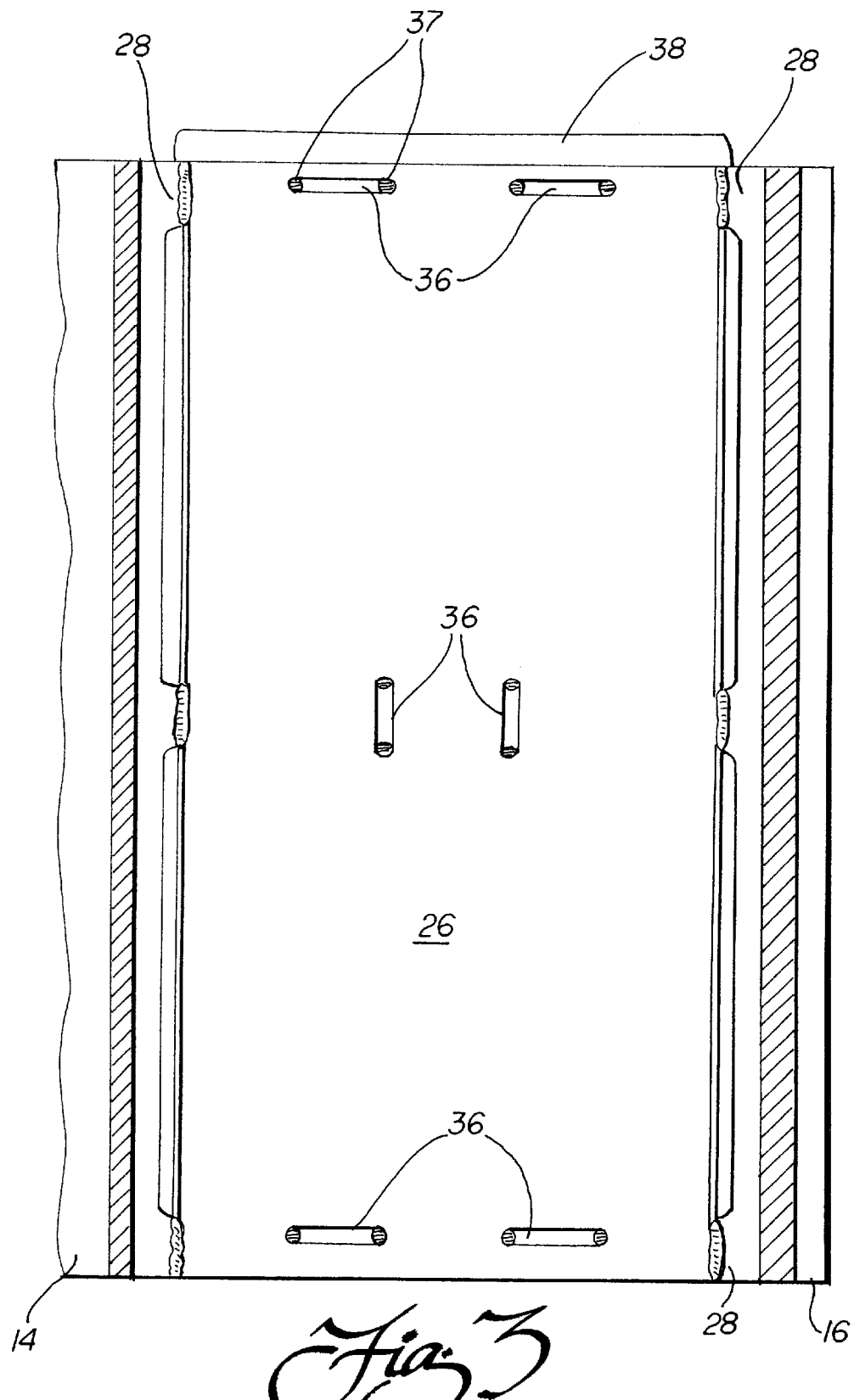
FIG. 3 is a horizontal cross-sectional view looking along line 3—3 in FIG. 2b, showing the slots in the lower support plate for receiving structural welds that assist in holding the upper deck plate in place.

Reference will now be made in detail to the present preferred embodiment of the invention, an example of which is illustrated in the accompanying drawing.

DETAILED DESCRIPTION OF THE INVENTION

Reference is now made to FIG. 1, which shows a preferred embodiment of the conveyor pan assembly 10 for use in an armored face conveyor forming an integral part of a longwall mining system. The pan assembly 10 includes an elongate upper deck plate 12 that defines a conveying surface S. Preferably, this upper deck plate 12 is fabricated of hardened steel or other abrasion-resistant material to withstand the extreme wear created as flight bars F are pulled along by a drive chain to move coal or other aggregate material along the conveying surface S (see dashed line outline in FIG. 2b).

The pan assembly 10 further includes a pair of opposed parallel sidewalls 14, 16 that provide support for the upper deck plate 12, as described further below. The sidewalls 14, 16 are preferably cast in steel as sigma sections having an upper run portion 18 and a lower run portion 20. As shown in FIG. 2b, the sidewalls 14, 16 adjacent the upper run portion 18 include concave recesses 22 that serve to guide the flight bars F along the forward run. In conjunction with the conveying surface S, these concave recesses 22 also serve to define the feed path P for the coal or other aggregate material being conveyed. The concave recesses 24 of the lower run portion 20 also act as guides for the flight bars F in returning to the upper run portion 18. A base plate 25 is welded to the lower ends of the pairs of sigma sidewalls 14, 16 forming each pan assembly 10. This plate 25 encloses the lower run portion 20, thereby protecting the scraper chain from interfering with projections on the mine floor as it traverses along the return run.

To provide support and maintain spacing for the sidewalls 14, 16, a lower support plate 26 is provided. Each sigma sidewall 14, 16 includes at least one, and preferably a plurality of inwardly projecting tabs 28 to provide attachment points for the lateral edges of the support plate 26. In the illustrated embodiment, the spaced tabs 28 project inwardly from each sigma sidewall 14, 16 (see FIG. 3) and are approximately 3.9 inches (100 millimeters) long. As perhaps best shown in FIG. 2c, the upper and lower lateral edges of the support plate 26 are beveled or chamfered for receiving structural welds 27, such as V-shaped or bevel welds, to form a butt welded joint. As noted above and discussed in more detail below, placing these structural welds 27 on spaced tabs 28 provides two significant advantages over known conveyor pan assemblies: (1) it moves the structural welds 27 totally away from the conveying surface S, which eliminates the potential for wear created as the flight bars F haul the aggregate material along the upper run of the conveyor pan assembly 10; and (2) it reduces the overall amount of structural welding required to fabricate each conveyor pan assembly 10, which in turn reduces manufacturing time, effort and overall expense.

Each sigma sidewall 14, 16 includes an elongated lateral groove 30 for receiving the respective corresponding lateral edges of the upper deck plate 12. As described in detail below, each lateral edge of the upper deck plate 12 is preferably provided with an outwardly projecting tongue 34 along its full length for insertion in the groove 30 formed in the adjacent sidewall 14, 16. In the illustrated embodiment, the upper edge of each groove 30 is defined by an upper lip 32 projecting inwardly from a lower portion of the upper concave recess 22 formed in each sidewall 14, 16. The lower edge or boundary of each groove 30 is thus defined by the inwardly projecting spaced tabs 28 to which the lower support plate 26 is structurally welded.

As should be appreciated, the upper deck plate 12 is installed by sliding the full length tongue 34 on each lateral edge thereof along the corresponding groove 30 formed in the adjacent sidewall 14, 16. This tongue and groove joint serves to mechanically captivate the upper deck plate 12 and hold it securely in place. Since the lower support plate 26 is welded to the inwardly extending tabs 28 defining the lower boundary of the grooves 30, the upper deck plate 12 directly overlies and partially rests upon the lower support plate 26. Thus, full support for the upper deck plate 12 is provided by the inwardly projecting tabs 28 and the lower deck plate 26, which in turn supports and maintains proper spacing for the sidewalls 14, 16.

It should also now be appreciated that the upper deck plate 12 fully covers the structural welds 27 between the inwardly projecting tabs 28 and the lower support plate 26. Since the conveying surface S is defined by the upper side of the upper deck plate 12, these structural welds 27 are thus shielded from wear created by the flight bars F and drive chain pulling coal or the like along the feed path P. An additional benefit is that the overlying upper deck plate 12 serves as a protective cover for the lower deck plate 26. Thus, the support plate 26 can be fabricated of mild rolled steel or other less expensive materials, as opposed to hardened or special abrasion-resistant steel.

In addition to the mechanical captivation provided by the tongue and groove joint, additional structural welds are placed in a plurality of slots 36 extending through the lower support plate 26 to assist in holding the upper deck plate 12 in place. For light duty operations, these structural welds can take the form of tack welds 37 focused at the interface between the upper edge of each slot 36 and the exposed underside surface of the upper deck plate 12. As should be appreciated, because these tack welds 37 are placed in slots 36 on the underside of the deck plate 12, they are kept totally away from the conveying surface S. Thus, like the other structural welds between the support plate 26 and the spaced tabs 28, these welds 37 are not subject to wear, which further enhances the durability of the pan assembly 12. Moreover, since these welds 37 are recessed in the slots 36, any contact with the flight bars F or drive chain moving along the return run portion 20 of the 18 conveyor pan assembly 10 is avoided. Instead of tack welds, it should be appreciated that the entire slot 36 can be partially or fully filled by a weld bead to provide additional strength to the pan assembly 10, such as may be necessary for use in heavy duty operations.

In the armored face conveyor, a plurality of conveyor pan assemblies 10 are typically interconnected to form the conveyor line. To construct a conveyor line with the pans 10 of the present invention, the upper deck plate 12 is mounted in an offset position in a longitudinal direction relative to the lower support plate 26 and sidewalls 14, 16. In this position, a lip 38 of the upper deck plate 12 projects past the parallel sidewalls 14, 16 (see FIG. 3). As best illustrated in the cross-sectional view of FIG. 4, this projecting lip 38 mates with the adjacent exposed narrow strip 39 of the support plate 26' of the next-in-line conveyor pan assembly 10' to form an overlapping joint. As should be appreciated, this exposed strip 39 results from the offset mounting of upper deck plate 12' of the next-in-line conveyor pan assembly 10', which allows it to mate with an exposed strip on a succeeding conveyor pan assembly (not shown).

The resulting overlapping joint formed between each pair of adjacent conveyor pan assemblies 10, 10' in the conveyor line provides several benefits. First, it avoids the need for specially forming the end faces of the adjacent support plates 26, 26'. This provides flexibility in swapping the pan assemblies between different conveyor lines formed of similar types of pan assemblies. Also, the overlapping joint eliminates interference with the flight bars F as they are pulled along the feed path P. Finally, this joint creates a secure connection between adjacent pan assemblies 10, 10'.

To provide additional assurances that the adjacent pan assemblies are completely prevented from pulling apart, especially during particularly long duty cycles or when heavy loading conditions are present, standard dogbone couplers may be placed in corresponding recesses formed in the ends of the adjacent sidewalls (not shown).

To fabricate the conveyor pan assembly 10 of the present invention, the sigma sidewalls 14, 16 are positioned adjacent to the sides of the lower support plate 26, which is held in an elevated position parallel to the ground by a jig or other support fixture. Any adjustments necessary to ensure that the lateral edges of the lower support plate 26 properly align with the respective tabs 28 are then made. Once in the proper position, the structural bevel welds 27 are placed along the interface between the spaced tabs 28 and the corresponding beveled upper and lower lateral edges on both sides of the lower support plate 26 to form the desired butt welded joints. As shown in detail in FIG. 2c, one or both the side edges of the tabs 28 are preferably chamfered to form a channel for receiving these bevel welds 27.

Once the lower support plate 26 is securely welded in place, the sigma sidewalls 14, 16 are fully supported and properly spaced. The outwardly projecting tongues 34 are then slid in the respective grooves 30 formed in the sidewalls 14, 16 (note the full line head of action arrow A in FIG. 1). As explained above, the upper deck plate 12 is preferably mounted such that a projecting lip 38 extends past the ends of the sidewalls 14, 16 to form the desired overlapping joint with the exposed strip 39 on the next-in-line conveyor pan assembly, such as pan assembly 10' in FIG. 4. Of course, sliding the upper deck plate 12 into position such that the lip 38 projects past the sidewalls 14, 16 is greatly facilitated by the tongue and groove joint. Preferably, the upper deck plate 12 projects past the sidewalls 14, 16 about 1.9 inches (48 millimeters), but this dimension may be adjusted as necessary for a particular application.

Once the upper deck plate 12 is slid into the proper position, the additional structural (tack or bead) welds are placed in the slots 36 formed in the lower support plate 26.

A significant advantage of the present invention is realized upon considering the ease with which the upper deck plate 12 is removed in the event wear necessitates replacement. The structural support provided by the lower support plate 26 permits the upper deck plate 12 to be quickly removed from the pan assembly 10. Specifically, the structural (tack or bead) welds are simply cut away from the interface between the slots 36 and the underside surface of the upper deck plate 12. The upper deck plate 12 then simply slides along the tongue and groove joint, while the sigma sidewalls 14, 16 remain fully supported by the lower deck plate 26 (note right end of action arrow A in FIG. 1). The spacing of the sidewalls 14, 16 remains constant during the removal of the upper deck plate 12 by virtue of the lower support plate 26, which significantly reduces the time and effort required for repairing the pan assembly 10 and returning it to service. A new upper deck plate 12 is then simply installed as described above and the pan assembly 10 is ready to be returned to service.

In summary, the conveyor pan assembly 10 of the present invention results in a significant improvement over prior art pan assemblies. An important aspect of the improved pan assembly 10 is the provision of a replaceable upper deck plate 12. It is fabricated of hardened abrasion-resistant steel or like materials that withstand significant wear. To facilitate installation and removal of the deck plate 12, the outwardly projecting tongues 34 extend along the lateral edges thereof and are slidably inserted in corresponding grooves 30 formed in a pair of opposed parallel sigma sidewalls 14, 16. A lower support plate 26 is mechanically attached in place, such as by structural welds 27 preferably placed only on a plurality of spaced tabs 28 projecting inwardly from the sigma sidewalls 14, 16. Thus, during installation or removal of the upper deck plate 12, the lower support plate 26 remains in place and provides full support for the sigma sidewalls 14, 16. Slots 36 formed in the underside of the lower support plate 26 receive recessed structural (tack or bead) welds 27 for further enhance the strength of the pan assembly 10. A first important advantage of this arrangement is that none of the structural welds holding the upper deck plate 12 and lower support plate 26 in place are exposed to wear created by the flight bars F and aggregate material moving along the conveying surface S. This considerably extends the service life of the pan assembly 10, which reduces maintenance expense and lost profits due to production downtime. A related and equally important advantage is that even when the upper deck plate 12 eventually wears out, it is easily removed by cutting the various structural welds and sliding it along the grooves 30, while the sidewalls 14, 16 remain appropriately spaced and fully supported by the lower support plate 26. During fabrication, the tongue and groove joint also facilitates mounting the upper deck plate 12 in an offset position in a longitudinal direction. In this position, an extended lip 38 of the deck plate 12 can overlap with an exposed strip 39 on the lower support plate 26' of the adjacent pan assembly 12'. Providing an overlapping joint in this manner avoids the need for specially forming the end faces of the adjacent pan assemblies 10, 10' to mate together.

The foregoing description of a preferred embodiment of the present invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

What is claimed is:

1. In an armored face conveyor system including a plurality of conveyor pan assemblies that interfit to define a feed path for handling coal or other aggregate material, each said conveyor pan assembly comprising:

a pair of opposed first and second sidewalls;

a lower support plate extending between and providing support for said sidewalls;

an elongated upper deck plate for placement over and attachment to said lower support plate to provide a conveying surface;

each of said sidewalls including an elongated groove for receiving a lateral edge of said upper deck plate;

whereby said lateral edges can slide along said grooves to facilitate installation or removal of said upper deck plate while said sidewalls remain attached to and fully supported by said lower support plate.

2. The conveyor pan assembly according to claim 1, wherein said lateral edges of said upper deck plate each include outwardly projecting tongues for mating with said grooves.

3. The conveyor pan assembly according to claim 1, wherein said sidewalls include sigma-shaped sections having an upper run portion for guiding flights connected to a driven chain, said flights moving the coal or other aggregate material along the feed path, and a lower run portion for guiding said flights in returning.

4. The conveyor pan assembly according to claim 1, wherein said lower support plate includes at least one slot extending therethrough and at least one structural weld is received in said slot to assist in holding said upper deck plate in place, said structural weld being away from said conveying surface and not subjected to wear created by the flights moving along the feed path of the armored face conveyor.

5. The conveyor pan assembly according to claim 1, wherein said upper deck plate is mounted in an offset position relative to said lower support plate such that the forward end thereof forms a projecting lip to mate with a narrow strip on the next-in-line conveyor pan assembly, whereby an overlapping joint is created that avoids the need for specially forming the ends of the conveyor pan assemblies to mate together.

6. The conveyor pan assembly according to claim 5, wherein said forward end of said upper deck plate overlies an exposed surface of a lower support plate forming said narrow strip on the next-in-line conveyor pan assembly.

7. The conveyor pan assembly according to claim 1, wherein each of said sidewalls includes at least one inwardly projecting tab for attaching said lower support plate so that the sidewalls are supported when the deck plate is removed.

8. The conveyor pan assembly according to claim 7, wherein a structural weld is provided between each lateral edge of said lower support plate and the corresponding tab projecting from the adjacent sidewall to attach said lower support place.

9. The conveyor pan assembly according to claim 7, wherein each said groove is partially defined by said at least one tab projecting from said respective sidewall.

10. The conveyor pan assembly according to claim 7, wherein each of said sidewalls further include a plurality of spaced, inwardly projecting tabs for attaching said support plate.

11. The conveyor pan assembly according to claim 1, wherein said upper deck plate is formed of hardened steel to provide said conveying surface with superior resistance to wear created by the flights moving the coal or other aggregate material along the feed path.

12. In an armored face conveyor system including a plurality of conveyor pan assemblies that interfit to define a feed path for handling coal or other aggregate material, each said conveyor pan assembly comprising:
   a pair of opposed first and second sidewalls;
   lower support plate extending between and providing support for said sidewalls, said lower support plate having at least one slot extending therethrough;
   an upper deck plate for placement over said lower support plate to provide a conveying surface; and
   means for attaching said upper deck plate to said lower support plate, said attaching means including a structural weld placed along the interface between said slot and a lower surface of said upper deck plate.

13. The conveyor pan assembly according to claim 12, wherein said upper deck plate further includes a tongue projecting from each lateral edge thereof and each of said sidewalls further includes an elongated groove for receiving said tongue, whereby said tongues can slide along said grooves to facilitate installation or removal of said upper deck plate while said sidewalls remain attached to and fully supported by said lower support plate.

14. The conveyor line assembly according to claim 12, wherein each of said sidewalls include at least one inwardly projecting tab for attaching said lower support plate.

15. The conveyor line assembly according to claim 14, wherein said lower support plate is structurally welded to said projecting tabs.

16. A method of fabricating a conveyor pan assembly for an armored face conveyor for handling coal or other aggregate material, comprising:
   attaching a lower support plate to a pair of opposed sidewalls, each said sidewall having a groove formed therein;
   inserting the lateral edges of an upper deck plate in said grooves;
   sliding said upper deck plate into position over the lower support plate; and
   attaching said upper deck plate to the lower support plate,
   whereby said upper deck plate may be efficiently installed or removed while said sidewalls remain attached to and fully supported by the lower support plate.

17. The method of fabricating a conveyor pan assembly according to claim 16, further including the step of placing at least one structural weld in a slot in said lower support plate to assist in attaching said upper deck plate to said lower support plate.

18. The method of fabricating a conveyor pan assembly according to claim 16, further including the step of positioning said upper deck plate in an offset position in a longitudinal direction relative to said lower support plate and said sidewalls.

19. The method of fabricating a conveyor pan assembly according to claim 16, wherein said sidewalls each include at least one inwardly projecting tab, wherein said step of attaching said lower support plate to said sidewalls further includes welding said support plate directly to said inwardly projecting tab.

20. A conveyor line for an armored face conveyor system for handling coal or other aggregate material, comprising:
   a first conveyor pan assembly including a first opposed pair of sidewalls supported in spaced relationship by a first lower support plate, each of said first pair of sidewalls having a groove for receiving a lateral edge of a first upper deck plate for placement over said support plate to provide a conveying surface; and
   a second conveyor pan assembly having a second lower support plate and a second upper deck plate spaced and positioned in the same manner;
   each of said first and second deck plates being positioned offset in the longitudinal position to form a projecting lip at one end and expose a corresponding narrow strip of the upper surface of said second lower support plate at the other end; the projecting lip of the first conveyor pan assembly overlapping the narrow strip of the second next-in-line conveyor pan assembly;
   said projecting lip being positioned directly over said narrow strip to form a substantially continuous feed path;
   whereby a continuous conveyor line is formed without the need for special forming of the ends.

\* \* \* \* \*